(12) United States Patent
Viola et al.

(10) Patent No.: US 7,473,741 B2
(45) Date of Patent: Jan. 6, 2009

(54) PROCESS FOR THE SELECTIVE HYDROGENATION OF UNSATURATED (CO)POLYMERS

(75) Inventors: Gian Tommaso Viola, Cervia (IT); Claudio Cavallo, Forlì' (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 11/381,469

(22) Filed: May 3, 2006

(65) Prior Publication Data

US 2006/0258814 A1 Nov. 16, 2006

(30) Foreign Application Priority Data

May 13, 2005 (IT) .............................. MI05A0860

(51) Int. Cl.
*C08C 19/02* (2006.01)
*C08F 36/02* (2006.01)

(52) U.S. Cl. .............. 525/331.9; 525/332.9; 525/333.1; 525/333.2; 525/338

(58) Field of Classification Search .............. 525/331.9, 525/332.9, 333.1, 333.2, 338
See application file for complete search history.

(56) References Cited

U.S. PATENT DOCUMENTS

| | | | |
|---|---|---|---|
| 5,948,869 A | 9/1999 | Vallieri et al. | |
| 6,228,952 B1 | 5/2001 | Viola et al. | |
| 6,313,230 B1 * | 11/2001 | Tsai et al. | 525/338 |
| 2007/0254802 A1 * | 11/2007 | Lin et al. | 502/152 |

FOREIGN PATENT DOCUMENTS

| EP | 0 801 079 A1 | 10/1997 |
|---|---|---|
| EP | 0 816 382 A1 | 1/1998 |
| EP | 816382 * | 1/1998 |
| EP | 0 908 234 A1 | 4/1999 |
| EP | 0 914 867 A1 | 5/1999 |
| EP | 0 974 602 A1 | 1/2000 |

OTHER PUBLICATIONS

U.S. Appl. No. 11/381,469, filed May 3, 2006, Viola et al.

* cited by examiner

*Primary Examiner*—Roberto Rábago
(74) *Attorney, Agent, or Firm*—Oblon, Spivak, McClelland, Maier & Neustadt, P.C.

(57) ABSTRACT

Process for the selective hydrogenation of double olefinic bonds present in polymers and copolymers of conjugated dienes, which comprises:

(a) preparation of a hydrocarbon solution of the (co)polymer to be hydrogenated, optionally containing a modifier (C);

(b) addition to the above solution of the (co)polymer to be hydrogenated of a catalytic solution formed "in situ" comprising:

(b1) at least one bis-(cyclopentadienyl)titanium derivative having general formula (I) $(C_5H_5)_2Ti(R)(R_1)$, wherein R and $R_1$, the same or different, are halogens, preferably $R=R_1=Cl$; the above compound (I) being dispersed in one or more non-solvent diluents;

(b2) at least one organo-derivative having general formula (II) $M(R_2)(R_3)$, wherein M is selected from zinc and magnesium, and $R_2$ and $R_3$, the same or different, are selected from $C_1$-$C_{16}$ alkyls, preferably $C_1$-$C_8$;

(b3) at least one modifier (C);

the above selective hydrogenation being carried out in a hydrogen atmosphere until the disappearance of the double olefinic bonds.

23 Claims, No Drawings

PROCESS FOR THE SELECTIVE HYDROGENATION OF UNSATURATED (CO)POLYMERS

The present invention relates to a process for the selective hydrogenation of double olefinic bonds present in unsaturated (co)polymers.

These (co)polymers are widely used on an industrial scale and can be obtained, for example, by the polymerization or copolymerization of conjugated dienes.

These (co)polymers have double olefinic bonds in the polymeric chain, which, although useful in vulcanization processes, are responsible for a low stability resistance, particularly with respect to oxidation.

In particular, the block copolymers obtained starting from conjugated dienes and from vinyl substituted aromatic hydrocarbons are used in a non-vulcanized form as thermo-plastic elastomers or as shock-resistant transparent resins or as modifiers of styrene resins and olefinic resins. Due to the presence of double olefinic bonds in the polymeric chain, the above block copolymers have a low resistance to oxidation, to ozone and to atmospheric aging. This is a serious drawback for their application.

This lack of stability can be considerably reduced by selectively hydrogenating the double olefinic bonds of the above copolymers.

The known methods for hydrogenating polymers having double olefinic bonds are based on (1) supported heterogeneous catalysts which consist in inert carriers (for example silica, alumina, carbon) on which a metal (for example nickel, palladium, platinum) is deposited and (2) non-supported heterogeneous catalysts obtained by reacting an organometallic compound of nickel, cobalt, titanium or the like, with a reducing compound such as an organo-aluminum, an organo-magnesium or an organo-lithium.

With respect to supported heterogeneous catalysts (1), non-supported catalysts (2) have the advantage of a greater activity. This is a considerable advantage as it allows blander conditions to be adopted and with smaller quantities of catalyst.

EP 816,382 describes a hydrogenation process of styrene-butadiene (SBS) copolymers by means of a titanium catalyst, preferably Ti-cyclopentadienyldichloride ($TiCp_2Cl_2$), and an alkylating agent typically $MgR_2$, wherein $R_2$ is an alkyl.

In consolidated practice, the catalyst described in EP 816,382 is prepared by mixing the Ti compound and Mg-alkyl separately (preformation) in a hydrocarbon suspending agent (for example cyclohexane), in a Ti:Mg ratio ranging from 1:1 to 1:10, typically from 1:1 to 1:3, preferably from 1:1 to 1:1.5, in the presence of a third component (an ether) The optimum ratio between Ti and Mg depends on the contents of the species which can interact with the catalyst. The hydrogenation process is effected by putting the above catalyst in contact, in the presence of hydrogen, with the solution to be hydrogenated.

This preformation process of the catalyst and its subsequent use for the hydrogenation of solutions of copolymers is not very flexible as it does not take into consideration the characteristics of the copolymers to be hydrogenated. In particular, as far as the optimal Ti/Mg ratio is concerned, if the active species present (chain-ends) have not been completely terminated by the addition of a protogenic substance (for example an alcohol), they act as reducing agents with respect to the titanium salt. In this case it is necessary to use a lower Mg/Ti ratio.

If, on the contrary, an excess of terminator is present in the polymer solution, this reacts with the Mg-alkyl; it is therefore necessary to use a greater quantity of Mg-alkyl.

The main drawback of this technique (separate preformation of the catalyst and its subsequent use in hydrogenation) lies in the activity of the catalyst thus prepared.

The activity of the preformed catalyst is in relation to the time, temperature and polarity of the medium in which the catalyst has been prepared; generally, the greater the polarity (usually provided by an ether) of the medium in which the catalyst has been formed, the greater its activity (measured as hydrogenation reaction rate) will be, as also the rate at which the catalyst is deactivated.

Consequently, if the catalyst is preformed in hexane, the activity is not exceptional, but the stability is good and increases with time; if it is prepared in the presence of ether, for example THF (4,000 ppm or more), the activity is very high but only in the period immediately after the preparation.

The preformation of the catalyst takes place at a fixed Ti/Mg ratio; during use, it is possible to "adjust" the ratio by increasing the quantity of Mg, but not that of the Ti. In other words, if the polymeric solution contains an excess of terminator, it is possible, by increasing the quantity of Mg, to increase the Mg/Ti ratio. If, on the contrary, the polymeric solution is still partially active, the preformed catalyst does not function.

A process has now been found which overcomes the above drawbacks, particularly evident in industrial practice where successive batches and not necessarily terminated at the same level, are hydrogenated in continuous.

In accordance with this, the present invention relates to a process for the selective hydrogenation of double olefinic bonds present in an unsaturated (co)polymer, which comprises:
(a) preparation of a hydrocarbon solution of the said (co)polymer to be hydrogenated, optionally containing a modifier (C);
(b) addition into the above solution of the (co)polymer, in a hydrogen atmosphere, of a catalytic solution formed "in situ" comprising:
(b1) at least one bis-(cyclopentadienyl)titanium derivative having general formula (I) $(C_5H_5)_2Ti(R)(R_1)$, wherein R and $R_1$, the same or different, are halogens, preferably $R=R_1=Cl$; the above compound (I) being dispersed in one or more non-solvent diluents;
(b2) at least one organo-derivative having general formula (II) $M(R_2)(R_3)$, wherein M is selected from zinc and magnesium, preferably magnesium, and $R_2$ and $R_3$, the same or different, are selected from $C_1$-$C_{16}$ alkyls, preferably $C_1$-$C_8$;
(b3) at least one modifier (C);

the above selective hydrogenation being carried out in a hydrogen atmosphere, preferably until the substantial disappearance of the double olefinic bonds.

In the preferred embodiment, the titanium compound (I) is kept in a suspension of cyclohexane preferably containing from 3,000 to 10,000 ppm of THF, effecting a grinding in the head of the pump (high shear). The suspension is then sent to the polymerization reactor introducing the Mg-alkyl, in the stream containing compound (I), in the most suitable ratio for having an active hydrogenation catalyst. As specified above, it is possible in this way to correct the Ti/Mg ratio so as to have an active catalyst both in excess and deficiency of terminator.

The other considerable advantage is that, in this way, a more active catalyst is obtained, as it is formed in the presence of ether at a high concentration, but used immediately, thus preventing the natural deactivation specifically observed in the presence of ethers.

As mentioned above, it is fundamental for compound (I) to be fed as a dispersion in a non-solvent diluent medium. The term dispersion refers to a multiphase system, in particular two-phase, in which one phase is continuous and the other finely dispersed.

In the preferred embodiment, the non-solvent diluent is introduced as a diluent of both the titanium compound (I) and the magnesium compound (II).

The above non-solvent diluent must be such as to not dissolve compound (I) and must also be inert with respect to compounds (I) and (II). More specifically, the above non-solvent diluent is selected from aliphatic saturated hydrocarbons and relative mixtures. Typical examples of these non-solvent diluents are propane, butane, n-hexane, n-pentane, iso-pentane, n-heptane, octanes, decanes, cyclo-pentane, variously alkylated cyclopentanes. The preferred non-solvent diluent is cyclohexane.

In the same way, the modifier (C) can be introduced into the hydrogenation environment alone or together with one or both of the compounds (I) and (II). In the preferred embodiment, the modifier is added together with the titanium compound.

The modifier (C) is selected from (C1) organic compounds containing at least one heteroatom, preferably nitrogenated and/or oxygenated, and (C2) aromatic compounds.

Typical groups of compounds (C1) containing a heteroatom are ethers, preferably $C_1$-$C_{20}$ ethers of ethylene glycol and diethylene glycol and tetrahydrofuran (THF).

Typical compounds having general formula (C2) are toluene, benzene, xylenes, preferably toluene.

The molar ratio between modifier (C) and Ti ranges from 0.01/1 to 200/1, preferably from 1/1 to 100/1.

The quantity of compound (I) (expressed as ppm of Ti) with respect to the quantity of (co)polymer to be hydrogenated is at least 5 ppm, preferably from 5 to 500 ppm, even more preferably from 25 to 200 ppm.

The hydrogenation reaction preferably takes place at a temperature ranging from 20° C. to 110° C. and a hydrogen pressure ranging from 0.1 to 5.0 MPa (1 to 50 bar), more preferably from 0.5 to 2.0 MPa.

The "in situ" catalyst formation in step (b) is preferably carried out under a hydrogen pressure ranging from 0.01 to 3 MPa, more preferably from 0.05 to 0.5 MPa, even more preferably at about atmospheric hydrogen pressure.

Preferred organo-magnesium derivatives having general formula (II) $Mg(R_2)(R_3)$ are those wherein $R_2$ and $R_3$, the same or different, are selected from $C_1$-$C_{16}$ alkyls, preferably $C_1$-$C_8$. Typical examples of magnesium dialkyls are magnesium di-n-butyl, magnesium di-isobutyl, magnesium di-isopropyl, magnesium di-cyclohexyl, magnesium butyl-isobutyl and related mixtures. The preferable molar ratio between $Mg(R_2)(R_3)$ and the titanium compound ranges from 1/1 to 10/1, even more preferably from 1.1/1 to 9/1.

The process of the present invention can be applied to the hydrogenation of any unsaturated (co)polymer, i.e. polymer or copolymer, containing double olefinic bonds, preferably to polymers or (co)polymers of conjugated dienes, obtained by polymerizing or copolymerizing conjugated dienes having from 4 to 12 carbon atoms. (Co)polymers of conjugated dienes comprise homopolymers of conjugated dienes, interpolymers of different conjugated dienes and copolymers obtained by copolymerizing at least one conjugated diene with at least one olefin co-polymerizable with the above conjugated diene.

Typical examples of conjugated dienes are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene. Isoprene and 1,3-butadiene, more preferably 1,3-butadiene, are particularly useful as intermediates for the production of elastomers having excellent physico-chemical properties. Typical examples of homopolymers which can be used in the process of the present invention are therefore polybutadiene, polyisoprene and butadiene/isoprene copolymers.

Olefinic monomers which can be used in the copolymerization together with the above dienes are all unsaturated monomers which can be copolymerized with the above conjugated dienes, particularly vinyl substituted aromatic hydrocarbons. Among these styrene, ter-butyl styrene, alpha-methyl styrene, o-methyl styrene, p-methyl styrene, vinyl naphthalene, are particularly suitable. In particular, the most useful vinyl aromatic compound is styrene.

Typical examples of block copolymers which can be used in the hydrogenation process of the present invention are those having the general formula $(B-T-A-B)_nX$, $(A-T-B)_nX$, A-T-B-T-BX, wherein B are polydiene blocks, the same or different, A is a polyvinyl aromatic block, T is a statistic copolymeric segment made up of diene and vinyl aromatic units, X is a coupling radical having a valence n, wherein n is an integer ranging from 1 to 20, the segment T content ranging from 0 to 40% by weight. If n is equal to 1, X is the residue of a quenching agent, for example —Si—$(CH_3)_3$ when monochlorotrimethylsilane is used as quenching agent. If n is equal to or higher than 2, X is the residue of a coupling agent, such as =Si$(CH_3)_2$ in the case of dimethylchlorosilane, $\equiv$Si $(CH_3)$ in the case of methyltrichlorosilane and =Si= in the case of silicon tetrachloride.

In the above block copolymers, the content of vinyl-substituted aromatic hydrocarbons ranges from 5 to 95%, preferably from 10 to 60%. In the above copolymers, the content of 1, 2 or 3, 4 units of the polydiene phase can vary from 10 to 80%.

In addition to the styrene-diene block copolymers indicated above, random copolymers with a linear or branched structure having monomers statistically distributed in the polymeric chain and a quantity of 1, 2 or 3, 4 units varying from 10 to 80%, can be hydrogenated with the process of the present invention.

The (co)polymers which can be used in the process of the present invention are not particularly discriminated with respect to the molecular weight. However, they generally have a number average molecular weight ranging from 1000 to about one million.

The (co)polymers which can be used in the process of the present invention can be produced with any method described in the prior art, for example anionic polymerization and polymerization by means of organometallic complexes. The above (co)polymers are preferably prepared by means of anionic polymerization in the presence of at least one organic compound having at least one lithium atom in the molecule. Examples of these organic compounds of lithium are n-propyl lithium, isopropyl lithium, n-butyl lithium, sec-butyl lithium, ter-butyl lithium, n-pentyl lithium, benzyl lithium, 1,4-dilithium-n-butane, 1,5-dilithium-pentane, 1,2-dilithium-diphenyl ethane.

If the polymerization has been effected by means of the anionic polymerization technique, the process of the present invention can be effected with either living (co)polymers or with coupled or deactivated (co)polymers.

Using the process of the present invention, it is possible to regulate the Ti/Mg ratio so as to have an active catalyst in both excess and deficiency of terminator.

Another considerable advantage is that, in this way, a more active catalyst is obtained as it is formed in the presence of ether at a high concentration, but can be used immediately thus avoiding the natural deactivation observed specifically in the presence of ethers.

The hydrogenation process according to the present invention can be carried out to any desired extent, up to the substantial disappearance of the double olefinic bonds, by adjusting the process conditions of hydrogen pressure, temperature and contact time. A certain amount of residual olefinic unsaturation may be desirable for additional reaction and functionalization of the (co)polymers. However substantially complete hydrogenation is mostly preferred in industrial applications, i.e., a iodometric hydrogenation degree of 99% or higher.

The following examples are provided for a better understanding of the present invention.

EXAMPLES

Examples are provided which demonstrate that the preparation of a catalyst in the presence of increasing quantities of ether, increases its activity, but that this depends, in an inversely proportional way, on the aging time of the catalyst. The examples are produced for a batch reactor.

Example 1

Preparation of Copolymer 1

8,400 g of cyclohexane, 174 g of styrene and 43 g of tetrahydrofuran are charged into a 25 liter autoclave; when the system has been thermostat-regulated at 45° C., 16 ml of a 1.5 M solution of sec-butyl-lithium are added. After 30 minutes, 852 g of 1,3-butadiene are added and the mixture is left to react for 10 minutes. 174 g of styrene are then added and the mixture is left to react for 15'. 12 ml of a 2 M solution of trimethyl-chloro-silane in cyclohexane are added to the polymeric solution thus obtained. The polymer thus obtained has a Mw of 50,000, a polydispersity (Mw/Mn) of 1.03 and a styrene content of 29% by weight. The 1, 2 content in the polydiene phase is 40%.

Example 2

Preparation of Copolymer 2

In a typical polymerization, 8,400 g of cyclohexane, 174 g of styrene and 43 g of tetrahydrofuran are charged into a 25 liter autoclave; when the system has been thermostat-regulated at 45° C., 16 ml of a 1.5 M solution of secbutyl-lithium are added. After 30 minutes, 852 g of 1,3-butadiene are added and the mixture is left to react for 10 minutes. 174 g of styrene are then added and the mixture is left to react for 15'. 24 ml of a 2 M solution of trimethyl-chloro-silane in cyclohexane are added to the polymeric solution thus obtained. The polymer thus obtained has a Mw of 50,000, a polydispersity (Mw/Mn) of 1.03 and a styrene content of 29% by weight. The 1,2 content in the polydiene phase is 40%.

Example 3 (Comparative)

Preparation of Catalytic Mixtures with Different THF Contents (Preformed Catalyst)

A series of solutions (3a-3d) with an increasing content of THF (0, 1000, 5000, 10,000 ppm w with respect to the solvent) obtained by charging 0.28 g of biscyclopentadienyl-titanium dichloride, 100 ml of cyclohexane and the increasing aliquots of THF as indicated in table 1, were prepared in a 500 ml reactor, in an argon atmosphere. The suspension was stirred with a recirculation pump equipped with a high shear head (IKA WERKE mod. 25 B) which effected the grinding of the $TiCP_2Cl_2$ granules up to dimensions of 20 μm. 1.7 ml of a 1 M solution of di-isobutyl-magnesium in heptane are added to the suspension so as to have a molar ratio Mg/Ti equal to 1.5. The mixtures prepared at a temperature of 25° C. and 60° C. were used for hydrogenating, according to the procedure described in Example 4, solutions of SBS prepared according to what is described in Example 1.

TABLE 1

| Nr. | $TiCp_2Cl_2$ (g) | Mg(i-but)$_2$ (g) | THF (g) | THF (ppm on solvent) | Mg/Ti (moles/moles) | THF/Ti (moles/moles) |
|---|---|---|---|---|---|---|
| 3-a | 0.28 | 0.23 | 0 | 0 | 1.5 | 0 |
| 3-b | 0.28 | 0.23 | 0.077 | 1000 | 1.5 | 0.95 |
| 3-c | 0.28 | 0.23 | 0.385 | 5000 | 1.5 | 4.75 |
| 3-d | 0.28 | 0.23 | 0.770 | 10000 | 1.5 | 9.50 |

In order to verify the dependence of the catalytic activity with time, the catalysts, prepared according to the procedures described, were used after being maintained at 25 and 60° C. for 1 minute, 120 minutes and 24 hours. Table 2 indicates the abbreviations of the catalysts obtained starting from catalysts 3-a, 3-b, 3-c, 3-d.

TABLE 2

| | temperature | 1 minute | 120 minutes | 24 hours |
|---|---|---|---|---|
| 3-a | 25° C. | 3-a1 | 3-a2 | 3-a3 |
| 3-a | 60° C. | 3-a4 | 3-a5 | 3-a6 |
| 3-b | 25° C. | 3-b1 | 3-b2 | 3-b3 |
| 3-b | 60° C. | 3-b4 | 3-b5 | 3-b6 |
| 3-c | 25° C. | 3-c1 | 3-c2 | 3-c3 |
| 3-c | 60° C. | 3-c4 | 3-c5 | 3-c6 |
| 3-d | 25° C. | 3-d1 | 3-d2 | 3-d3 |
| 3-d | 60° C. | 3-d4 | 3-d5 | 3-d6 |

Example 4 (Comparative)

Hydrogenation Reactions with Pre-formed Catalyst Under Different Conditions

In a typical hydrogenation reaction, 4,800 g of polymeric solution prepared as described in Example 1, are fed to a 16 liter reactor under a hydrogen atmosphere, under stirring, and thermostat-regulated at 90° C. The catalytic composition prepared as in Example 3 is then added to this solution in such a quantity that the Ti content calculated with respect to the dry rubber proved to be 90 ppm and the molar ratio of double olefinic bonds/moles of titanium proved to be 6930. The hydrogen pressure in the reactor is then brought to 8 kg/cm$^2$.

During the hydrogenation reaction, rubber samples were collected, which, after eliminating the solvent, were analyzed by means of iodometric titration to determine the hydrogenation degree (HD). The final temperature of the reactor proved to be 110° C. The results indicated in Table 3 were obtained.

Comment on Table 3

The hydrogenation tests effected using the catalyst prepared without THF (3-a) showed an improvement in the activity in relation to the time and temperature at which the catalysts were maintained after its preparation; 3-a1<3-a2<3-a3<3-a4<3-a5<3-a6.

The catalysts prepared in the presence of 1,000 ppm of THF (3-b) showed a greater activity with respect to that of the series (3-a), but a lower resistance with an increase in time and temperature. The catalyst with the maximum activity proved to be that prepared at 60° C. and used after a minute (3-b4).

The catalysts prepared in the presence of 5000 ppm of THF (3-c) showed an optimum activity if prepared at 25° C. and used immediately (3-c1). The increase in aging time and temperature at which the catalyst is maintained have a negative effect on the activity: 3-c6<3-c5<3-c3<3-c4<3-c2<3-c1.

The catalysts prepared in the presence of 10,000 ppm of THF (3-d) confirmed the trend. The most active is that prepared at 25° C. and used immediately; the increase in time and temperature cause a rapid and heavy loss of properties.

TABLE 3

| Test Preformation | Hydrogenation degree | | | | | |
|---|---|---|---|---|---|---|
| Time (min.) | 5 | 10 | 30 | 60 | 90 | 120 |
| 3-a1 | 9 | 15 | 40 | 66 | 82 | 85 |
| 3-a2 | 10 | 19 | 45 | 70 | 85 | 91 |
| 3-a3 | 13 | 25 | 54 | 79 | 93 | 95 |
| 3-a4 | 16 | 28 | 60 | 86 | 96 | >99 |
| 3-a5 | 24 | 35 | 70 | 92 | 98 | >99 |
| 3-a6 | 27 | 41 | 74 | 95 | >99 | |
| 3-b1 | 15 | 22 | 72 | 95 | >99 | |
| 3-b2 | 25 | 43 | 84 | >99 | | |
| 3-b3 | 13 | 24 | 55 | 83 | 95 | 96 |
| 3-b4 | 24 | 44 | 92 | >99 | | |
| 3-b5 | 15 | 18 | 58 | 78 | 86 | 91 |
| 3-b6 | 8 | 15 | 38 | 62 | 78 | 82 |
| 3-c1 | 24 | 45 | 91 | >99 | | |
| 3-c2 | 15 | 23 | 72 | 88 | 92 | 92 |
| 3-c3 | 12 | 20 | 47 | 77 | 82 | 83 |
| 3-c4 | 15 | 22 | 77 | 89 | 92 | 95 |
| 3-c5 | 8 | 15 | 37 | 67 | 75 | 82 |
| 3-c6 | 4 | 8 | 25 | 41 | 51 | 56 |
| 3-d1 | 42 | 70 | >99 | | | |
| 3-d2 | 25 | 45 | 84 | 97 | >99 | |
| 3-d3 | 10 | 21 | 44 | 62 | 67 | 71 |
| 3-d4 | 37 | 56 | 92 | 92 | 92 | 92 |
| 3-d5 | 5 | 9 | 22 | 41 | 51 | 53 |
| 3-d6 | 4 | 7 | 18 | 37 | 45 | 46 |

Example 5 (comparative)

Hydrogenation Reactions with Pre-formed Catalyst on Polymeric Solutions with Different Deactivation Degrees The hydrogenation reaction is carried out with the procedure described in Example 4 using the preformed catalyst under the conditions of 3-c1 and on a polymeric solution obtained as indicated in Example 2. The results are specified in Table 4, compared with the results obtained (Example 3) under analogous conditions on the polymeric solution obtained as per Example 1.

Comment on Table 4

In the case of an excess of trimethyl-chloro-silane a deterioration is observed in the catalytic activity A re-addition of di-isobutyl-magnesium to the polymeric solution causes a partial reactivation of the catalyst

TABLE 4

| | | | Hydrogenation degree (%) | | | | | |
|---|---|---|---|---|---|---|---|---|
| Nr. | Polymeric solution | Mg(i-but)$_2$ (cc)* | 5 min | 10 min | 30 min | 60 min | 90 min | 120 min |
| 4a | Copolymer 1 | 0 | 42 | 70 | >99 | — | — | — |
| 4b | Copolymer 2 | 0 | 0 | 0 | 10 | — | — | 11 |
| | | 1.7 | 12 | 12 | 24 | 30 | 38 | 42 |

*this means the quantity of di-isobutyl-magnesium in a 2M solution in heptane added in the reactor in addition to the initial quantity after 30 minutes.

Example 6 (According to the Invention)

Hydrogenation Reactions with Catalyst Prepared In Situ

In a typical hydrogenation reaction, 4,800 g of polymeric solution prepared as described in Example 1, are fed to a 16 liter reactor in a hydrogen atmosphere, under stirring and thermostat-regulated at 90° C. A suspension of $Cp_2TiCl_2$ prepared as in Example 2 in the presence of 5,000 ppm w of THF is added to this solution in such a quantity that the Ti content calculated with respect to the dry rubber proved to be 90 ppm and the molar ratio of double olefinic bonds/moles of titanium proved to be 6930.

1.7 ml of a 1M solution of di-isobutyl-magnesium in heptane are then added to the polymeric solution so as to have an Mg/Ti molar ratio equal to 1.5. The hydrogen pressure in the reactor is subsequently brought to 8 kg/cm$^2$. During the hydrogenation reaction rubber samples were collected which, after elimination of the solvent, were analyzed by means of iodometric titration to determine the hydrogenation degree (HD). The final temperature of the reactor proved to be about 110° C. The results obtained are indicated in Table 5.

Comments on Table 5

In this series of hydrogenations all carried out in the same way, the TiCp$_2$Cl$_2$ is added to the polymer solution as per the anionic synthesis and therefore containing ether; the Mg-alkyl is then added.

It can be seen how, in the case of a perfectly neutralized copolymer, the catalyst hydrogenates the SBS copolymer extremely rapidly.

In the case of a copolymer in which an excess of TMS has been used, the correction of the Mg/Ti ratio effected by injecting successive aliquots of Mg alkyl into the hydrogenation reactor, makes the hydrogenation possible.

TABLE 5

| | | | Hydrogenation degree (%) | | | | | |
|---|---|---|---|---|---|---|---|---|
| Nr. | Polymeric solution | Mg(i-but)$_2$ (cc)* | 5 min | 10 min | 30 min | 60 min | 90 min | 120 min |
| 5-a | Copolymer 1 | 0 | 65 | >99 | — | — | — | — |
| 5-b | Copolymer 2 | 0 | 0 | 0 | 12 | — | — | — |
| | | 1.7 | 70 | >99 | — | — | — | — |

TABLE 5-continued

| | | Hydrogenation degree (%) | | | | | |
|---|---|---|---|---|---|---|---|
| Polymeric Nr. solution | Mg(i-but)$_2$ (cc)* | 5 min | 10 min | 30 min | 60 min | 90 min | 120 min |

*this means the quantity of di-isobutyl-magnesium in a 2M solution in heptane added in the reactor in addition to the initial quantity after 30 minutes.

The invention claimed is:

1. A process for the selective hydrogenation of double olefinic bonds present in an unsaturated (co)polymer, which comprises:
   (a) preparation of a hydrocarbon solution of said unsaturated (co)polymer to be hydrogenated, optionally containing a modifier (C);
   (b) in situ formation, under a hydrogen atmosphere, of a catalytic solution in said hydrocarbon solution by addition into said hydrocarbon solution of:
      (b1) at least one bis-(cyclopentadienyl) titanium derivative having the general formula (I) $(C_5H_5)_2Ti(R)(R_1)$, wherein R and $R_1$, the same or different, are halogens;
      the above compound (I) being dispersed in one or more non-solvent diluents;
      (b2) at least one organo-derivative having general formula (II) $M(R_2)(R_3)$,
      wherein M is selected from zinc and magnesium, and $R_2$ and $R_3$, the same or different, are selected from $C_1$-$C_{16}$ alkyls; and
      (b3) at least one modifier (C);
   the above selective hydrogenation being carried out in a hydrogen atmosphere,
   wherein said modifier (C) is selected from nitrogenated organic compounds, oxygenated organic compounds, and aromatic compounds.

2. The process according to claim 1, wherein the selective hydrogenation is carried out until substantial disappearance of the double olefinic bonds.

3. The process according to claim 1, wherein R=$R_1$=Cl.

4. The process according to claim 1, wherein M is magnesium and $R_2$ and $R_3$, the same or different, are selected from $C_1$-$C_8$ alkyls.

5. The process according to claim 1, wherein compound (I) is dispersed in cyclohexane.

6. The process according to claim 1, wherein the molar ratio between $M(R_2)(R_3)$ and the titanium derivative ranges from 1/1 to 10/1.

7. The process according to claim 6, wherein the molar ratio between $M(R_2)(R_3)$ and the titanium derivative ranges from 1.1/1 to 9/1.

8. The process according to claim 1, wherein the modifier (C) is selected from tetrahydrofuran, $C_1$-$C_{20}$ ethers of ethylene glycol, $C_1$-$C_{20}$ ethers of diethylene glycol, and toluene.

9. The process according to claim 1, wherein the molar ratio between the modifier (C) and Ti ranges from 0.01/1 to 200/1.

10. The process according to claim 9, wherein the molar ratio between the modifier (C) and Ti ranges from 1/1 to 100/1.

11. The process according to claim 1, characterized in that it is carried out at a temperature ranging from 20° C to 110° C and a hydrogen pressure ranging from 1 to 50 bar.

12. The process according to claim 1, wherein the unsaturated (co)polymer is selected from (co)polymers of 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene.

13. The process according to claim 12, wherein the unsaturated (co)polymer is selected from (co)polymers of 1,3-butadiene and isoprene.

14. The process according to claim 1, wherein the unsaturated (co)polymer is selected from copolymers of conjugated dienes/vinyl arenes.

15. The process according to claim 14, wherein the vinyl arene is styrene.

16. The process according to claim 14, wherein the copolymers of conjugated dienes/vinyl arenes are selected from styrene-isoprene-styrene (SIS) and styrene-butadiene-styrene (SBS) rubbers.

17. The process according to claim 1, wherein the titanium compound (I) is fed to said hydrocarbon solution as a suspension of cyclohexane containing from 3,000 to 10,000 ppm of THF.

18. The process according to claim 1, wherein the quantity of compound (I) (expressed as ppm of Ti) with respect to the quantity of (co)polymer to be hydrogenated, is at least 5 ppm.

19. The process according to claim 18, wherein the quantity of compound (I) (expressed as ppm of Ti) with respect to the quantity of (co)polymer to be hydrogenated, ranges from 5 to 500 ppm.

20. The process according to claim 19, wherein the quantity of compound (I) (expressed as ppm of Ti) with respect to the quantity of (co)polymer to be hydrogenated, ranges from 25 to 200 ppm.

21. The process according to claim 1, wherein said unsaturated (co)polymer is selected from polymers and copolymers of conjugated dienes.

22. The process according to claim 1, wherein said "in situ" catalyst formation in (b) is carried out under a hydrogen pressure ranging from 0.01 to 3 MPa.

23. The process according to claim 22, wherein (b) is carried out under about atmospheric hydrogen pressure.

* * * * *